(12) United States Patent
Wu

(10) Patent No.: US 9,226,195 B2
(45) Date of Patent: *Dec. 29, 2015

(54) METHOD FOR DETERMINING RLC DATA PDU SIZE IN WIRELESS COMMUNICATIONS SYSTEM ACCORDING TO CONTROL DATA

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 1345 days.

This patent is subject to a terminal disclaimer.

(21) Appl. No.: 12/164,121

(22) Filed: Jun. 30, 2008

(65) Prior Publication Data

US 2009/0323671 A1    Dec. 31, 2009

(51) Int. Cl.
| | |
|---|---|
| *H04W 28/04* | (2009.01) |
| *H04W 28/06* | (2009.01) |
| *H04W 74/06* | (2009.01) |
| *H04W 80/02* | (2009.01) |
| *H04L 1/16* | (2006.01) |
| *H04L 1/18* | (2006.01) |
| *H04L 12/66* | (2006.01) |

(52) U.S. Cl.
CPC ........... *H04W 28/065* (2013.01); *H04L 1/1887* (2013.01); *H04L 1/1685* (2013.01); *H04L 12/66* (2013.01); *H04W 28/04* (2013.01); *H04W 74/06* (2013.01); *H04W 80/02* (2013.01)

(58) Field of Classification Search
CPC ... H04W 28/065; H04W 80/02; H04W 28/04; H04W 74/06; H04L 1/1887; H04L 1/1685; H04L 1/188; H04L 12/66

USPC .......... 370/352–356, 498, 503, 474; 709/220–226

See application file for complete search history.

(56) References Cited

U.S. PATENT DOCUMENTS 7,181,223 B1 * 2/2007 Pecen et al. ................ 455/452.1
7,860,992 B2 * 12/2010 Robinson ..................... 709/231
(Continued)

FOREIGN PATENT DOCUMENTS

| CN | 1864363 A | 11/2006 |
|---|---|---|
| DE | 20 2006 006 863 U1 | 11/2006 |

(Continued)

OTHER PUBLICATIONS

NTT DOCOMO, Inc. : "RLC segmentation and concatenation", 3GPP TSG RAN WG2 #61, R2-081159, Feb. 11-15, 2008, XP050138937, Sorrento, Italy.

(Continued)

*Primary Examiner* — Parth Patel
*Assistant Examiner* — Kai Chang
(74) *Attorney, Agent, or Firm* — Winston Hsu; Scott Margo

(57) ABSTRACT

A method of determining a size of Data PDUs of an RLC AM entity includes: (a) utilizing a MAC layer to set a transmission payload size; (b) determining whether the transmission payload size is larger than or equal to at least a Control PDU size; (c) when the transmission payload size is larger than or equal to the Control PDU size, submitting the Control PDU to the MAC layer; (d) adjusting the transmission payload size by subtracting the size of the submitted Control PDU; (e) repeating steps (b), (c) and (d) for all Control PDUs; and (f) utilizing a final adjusted transmission payload size in step (d) to determine a size of a Data PDU.

6 Claims, 3 Drawing Sheets

(56) References Cited

U.S. PATENT DOCUMENTS

| | | | |
|---|---|---|---|
| 7,864,777 B1* | 1/2011 | Nuriyev | H04L 47/10 370/395.4 |
| 8,050,292 B2* | 11/2011 | Wu | 370/470 |
| 8,259,732 B2 | 9/2012 | Torsner | |
| 8,553,672 B2 | 10/2013 | Terry | |
| 2005/0249244 A1* | 11/2005 | McNamara et al. | 370/474 |
| 2006/0120392 A1* | 6/2006 | Ye et al. | 370/412 |
| 2006/0168313 A1* | 7/2006 | Robinson | 709/236 |
| 2006/0176881 A1* | 8/2006 | Ma et al. | 370/392 |
| 2006/0268821 A1* | 11/2006 | Terry | 370/349 |
| 2006/0268938 A1* | 11/2006 | Terry | 370/477 |
| 2007/0081513 A1* | 4/2007 | Torsner | 370/349 |
| 2007/0280158 A1* | 12/2007 | Qiu et al. | 370/329 |
| 2008/0233941 A1* | 9/2008 | Jen | 455/418 |
| 2009/0086709 A1* | 4/2009 | Pani et al. | 370/349 |
| 2009/0103511 A1* | 4/2009 | Marinier et al. | 370/345 |
| 2009/0219951 A1* | 9/2009 | Chun et al. | 370/474 |
| 2011/0019756 A1* | 1/2011 | Chun et al. | 375/260 |

FOREIGN PATENT DOCUMENTS

| | | |
|---|---|---|
| TW | 201018288 | 5/2010 |
| WO | 2005034418 A1 | 4/2005 |

OTHER PUBLICATIONS

Samsung: "On omitting the last LF field", 3GPP TSG-RAN2 Meeting #60bis, R2-080164, Jan. 14-18, 2008, XP050138044, Sevilla, Spain.

Ericsson: "Summary of the email discussion on RLC PDU size selection", 3GPP TSG-RAN WG2#62, R2-082122, May 5-9, 2008, pp. 1/6-6/6, XP002607644, Kansas City, USA.

Ericsson: "MAC header structure", 3GPP TSG-RAN WG2 #59bis, Tdoc R2-074062, Oct. 8-12, 2007, pp. 1/4-4/4, XP050136694, Shanghai, China.

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V.8.2.0 (May 2008), XP002554077, 3GPP, France.

Office action mailed on Nov. 1, 2013 for the Taiwan application No. 098122039, filing date Jun. 30, 2009, p. 1-8.

Office action mailed on Jul. 1, 2014 for the China application No. 201210305887.6, filing date: Jun. 30, 2009.

* cited by examiner

METHOD FOR DETERMINING RLC DATA PDU SIZE IN WIRELESS COMMUNICATIONS SYSTEM ACCORDING TO CONTROL DATA

BACKGROUND OF THE INVENTION

1. Field of the Invention

The present invention relates to a radio communication system, and in particular to a method for determining sizes of packet data units when control packet data units are transmitted at the same time in an E-UTRA communications system.

2. Description of the Prior Art

The following description contains many terms related to the E-UTRA communications system. For simplicity of explanation, the following acronyms will be used.

AM=Acknowledged Mode
MAC=Medium Access Control
PDU=Packet Data Unit
RLC=Radio Link Control
SDU=Service Data Unit
TB=Transport Block
TP=Transmission Payload
TM=Transparent Mode
UE=User Equipment
UM=Unacknowledged Mode
UMTS=Universal Mobile Telecommunication System Radio Link Control (RLC) is a protocol for a user equipment-Evolved UMTS Terrestrial Radio Access Network (UE-EUTRAN) radio interface. Communications packets are transmitted between a physical layer, a MAC layer, and an RLC layer. The RLC layer consists of three RLC entities: a TM entity, a UM entity, and an AM entity. Amongst these entities, the AM entity exchanges status information using Control PDUs to guarantee reliable transmissions. This system of receiving transmission acknowledgments enables a transmitting AM entity to retransmit RLC PDUs that are not received by a receiving AM entity. The AM entity is therefore bi-directional An AM entity includes a transmitting side and a receiving side. The MAC layer selects a TB size in a next transmission timing. In the transmitting side, RLC SDUs are segmented and/or concatenated into AM Data PDUs of a variable length at a segmentation/concatenation unit according to the TB size selected by MAC. If Data PDUs to be retransmitted do not fit into the new TB size selected by MAC at the particular transmission opportunity notified by MAC, the AM entity segments the retransmission PDUs into retransmission PDU segments. The number of times re-segmentation can occur is not limited. The Data PDU may therefore contain segmented and/or concatenated RLC SDUs (depending on the size of the PDU). Length indicators are used to define boundaries between RLC SDUs within Data PDUs.

The AM entity can request a status report from the peer AM entity to confirm whether transmitted Data PDUs are received, by setting a polling bit in the Data PDUs. The receiving side of the peer AM entity will then generate Control PDUs, where Data PDUs buffered in the Retransmission buffer are deleted or retransmitted based on a status report found within the Control PDUs.

The PDUs are delivered to a unit that completes the Data PDU header based on an input from an RLC Control Unit that indicates values to set in various fields (e.g. Polling Bit). Once a complete RLC SDU has been received in the peer AM entity, the associated Data PDUs are reassembled by a Reassembly Unit and delivered to upper layers.

In the current E-UTRA RLC spec [1], the RLC SDUs are segmented and/or concatenated in accordance with the TB size selected by MAC at the particular transmission opportunity notified by MAC. When a Control PDU is also transmitted or two or more RLC entities with equal logical channel priority have data to transmit, the segmentation/or concatenation according to TB size selected by MAC may not be suitable. This situation is illustrated by the following examples.

EXAMPLE 1

The MAC multiplexes SDUs onto transport blocks from more than one logical channel for delivery to the physical layer. MAC selects a TB size according to physical layer grant and then an RLC entity segments or concatenates the PDUs according to the TB size. If, however, more than one logical channel is multiplexed in a shared channel (i.e. the logical channels have equal priority) then the MAC has to share the TB size between logical channels. For example, if two RLC entities with equal logical channel priority have RLC SDUs to transmit, each RLC entity generates a Data PDU with a size which cannot be transmitted by MAC simultaneously. Furthermore, when a retransmission PDU is transmitted, it will not be able to be transmitted by MAC if its size is the same as the selected TB size at that particular transmission opportunity.

EXAMPLE 2

An E-UTRA RLC entity has SDUs in an RLC buffer for transmission. The RLC entity receives a polling from a peer RLC entity and generates a Control PDU in response. Data PDUs are generated according to the TB size selected by MAC. If the RLC entity wants to send this Control PDU as soon as it is generated, Data PDUs waiting to be transmitted must be re-segmented in order to multiplex the Control PDU. PDU segment headers are larger than PDU headers, so the efficiency of the system is reduced.

EXAMPLE 3

An E-UTRA AM RLC entity has SDUs in an RLC buffer for transmission. The AM RLC entity receives a polling from the peer RLC entity and generates a Control PDU. If the AM RLC entity follows a first-in first-out rule for PDU transmission, the Control PDU will not be transmitted until the RLC SDUs have been transmitted. This late delivery of the Control PDU causes a delay for the upper layers to receive the RLC SDUs, as the peer RLC entity cannot release memory until it is known which Data PDUs have been transmitted successfully.

In the first example, the prior art does not adequately provide solutions for determining Data PDU sizes when more than one logical channel is multiplexed. In the second example, determining the size of a Data PDU only according to the TB size can cause problems when Control PDUs are also generated. In the third example, lack of priority of Control PDU transmission can cause delays. Therefore, a method is proposed to determine the size of RLC Data PDUs when RLC Control PDUs are transmitted at the same time in order to solve the above-mentioned problems.

SUMMARY OF THE INVENTION

The present invention provides two methods for solving the problems associated with the prior art.

A method of determining a size of Data PDUs of an RLC AM entity comprises: (a) utilizing the MAC layer to set a transmission payload size; (b) determining whether the transmission payload size is larger than or equal to at least a Control PDU size; (c) when the transmission payload size is larger than or equal to the Control PDU size, submitting the Control PDU to the MAC; (d) adjusting the transmission payload size by subtracting the size of the submitted Control PDU; (e) repeating steps (b), (c) and (d) for all Control PDUs; and (f) utilizing a final adjusted transmission payload size in step (d) to determine a size of a Data PDU.

A method of determining a size of Data PDUs of an RLC UM/AM entity according to a second embodiment comprises: utilizing the MAC layer to set a transport block size for a plurality of RLC SDUs to be transmitted according to physical layer grant; selecting to transmit MAC Control elements in a first transmission timing; calculating a total transmission payload as the transport block size minus the size of the MAC Control elements; and setting a transmission payload size for a next transmission timing according to the total transmission payload and the transport block size.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to provide methods for accurately determining the size of RLC Data PDUs when RLC Control PDUs or MAC Control information is sent at the same time, thereby avoiding excessive re-segmentation, and problems arising from late delivery of Control PDUs.

The methods of the present invention introduce a new transmission priority scheme whereby RLC Control PDUs are given highest transmission priority. Transmission payload is then adjusted for the sent RLC Control PDUs, thereby enabling MAC to accurately set sizes for RLC Data PDUs. In a second scheme, the TB size is set first, and MAC Control elements are given highest transmission priority. The payload is then adjusted to take account of the sent MAC Control elements, and a transmission payload is set for a next transmission opportunity according to the total payload and the selected TB size.

In a first embodiment of the present invention, a transmission payload (TP) size is selected by MAC in a next transmission timing. The RLC entity determines whether Control PDUs exist in the transmitting side. If there are Control PDUs to be transmitted, the RLC entity confirms that the TP size is sufficient for Control PDU transmission and arranges the Control PDUs for transmission if there is a positive confirmation. The transmission payload size of this transmission opportunity will then be adjusted to take account of these Control PDUs (and, optionally, corresponding MAC sub-header sizes). If there is still space available in this transmission timing, retransmission Data PDUs and new Data PDUs can also be transmitted. This is determined by confirming that the TP size is larger than or equal to a Data PDU header size (and, optionally, a corresponding MAC sub-header size). The order of Data PDUs to be transmitted will conform to the conventional priority order, whereby retransmission Data PDUs have higher priority than new Data PDUs. Following this transmission order priority, size of TP available for a new Data PDU can be calculated as:

TP size−size of each Control PDU−size of each retransmitted Data PDU−size of each retransmitted Data PDU segment−MAC sub-header size of each Control PDU−MAC sub-header size corresponding to each retransmission Data PDU−MAC sub-header size corresponding to each retransmission Data PDU segment−MAC sub-header size corresponding to the new Data PDU It should be noted that the above equation includes the term "MAC sub-header size corresponding to each retransmission Data PDU segment" as it is possible that a retransmission Data PDU is too large to fit into the TP but a segment can be transmitted. Furthermore, in some embodiments, the sub-headers are not counted in RLC and therefore the sizes of said sub-headers do not need to be taken into account when calculating remaining TP size. This should be easily understood by those skilled in the art.

Figure 1:
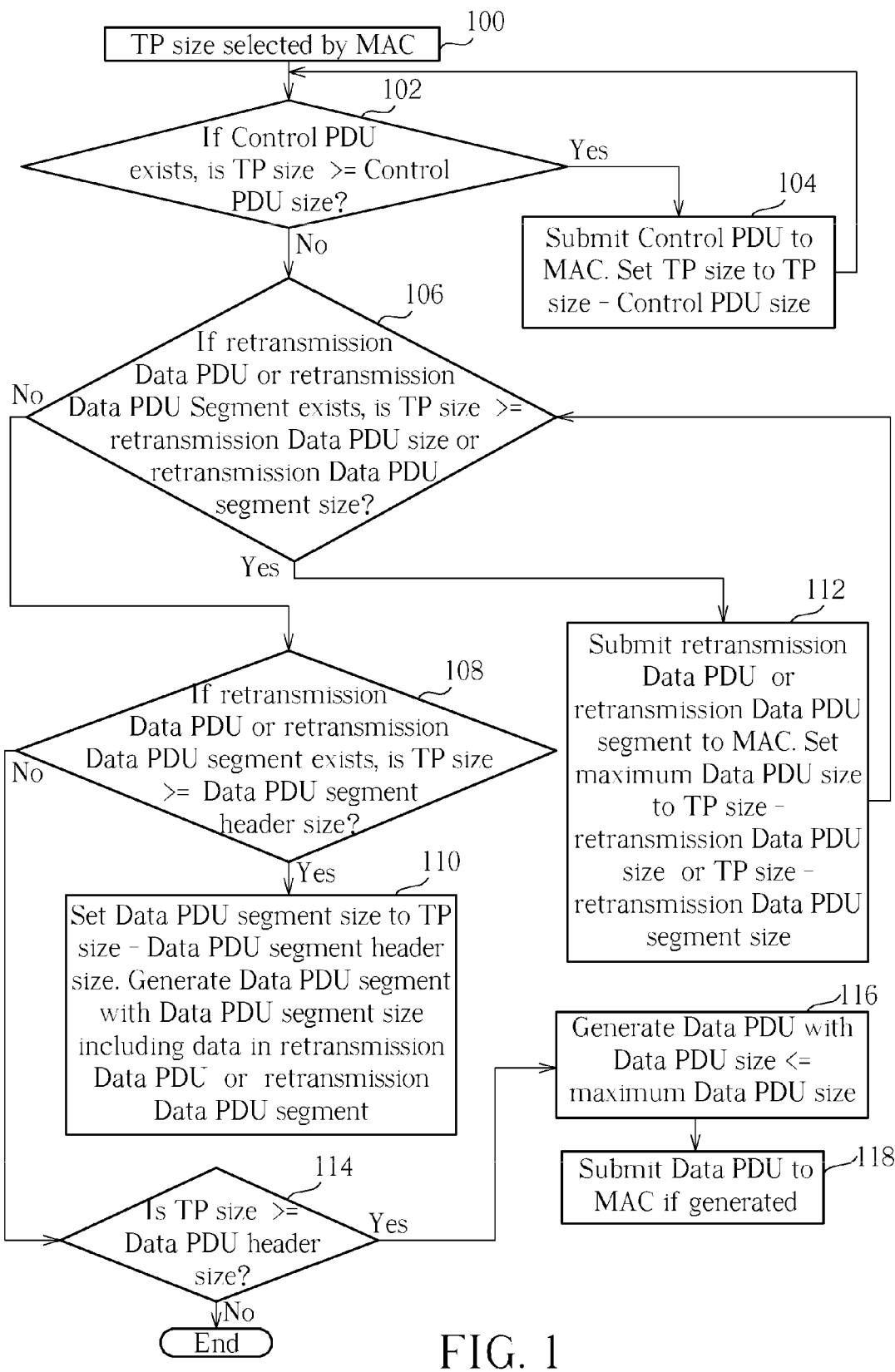
FIG. 1 is a flowchart of a method according to a first embodiment of the present invention.
Figure 2:
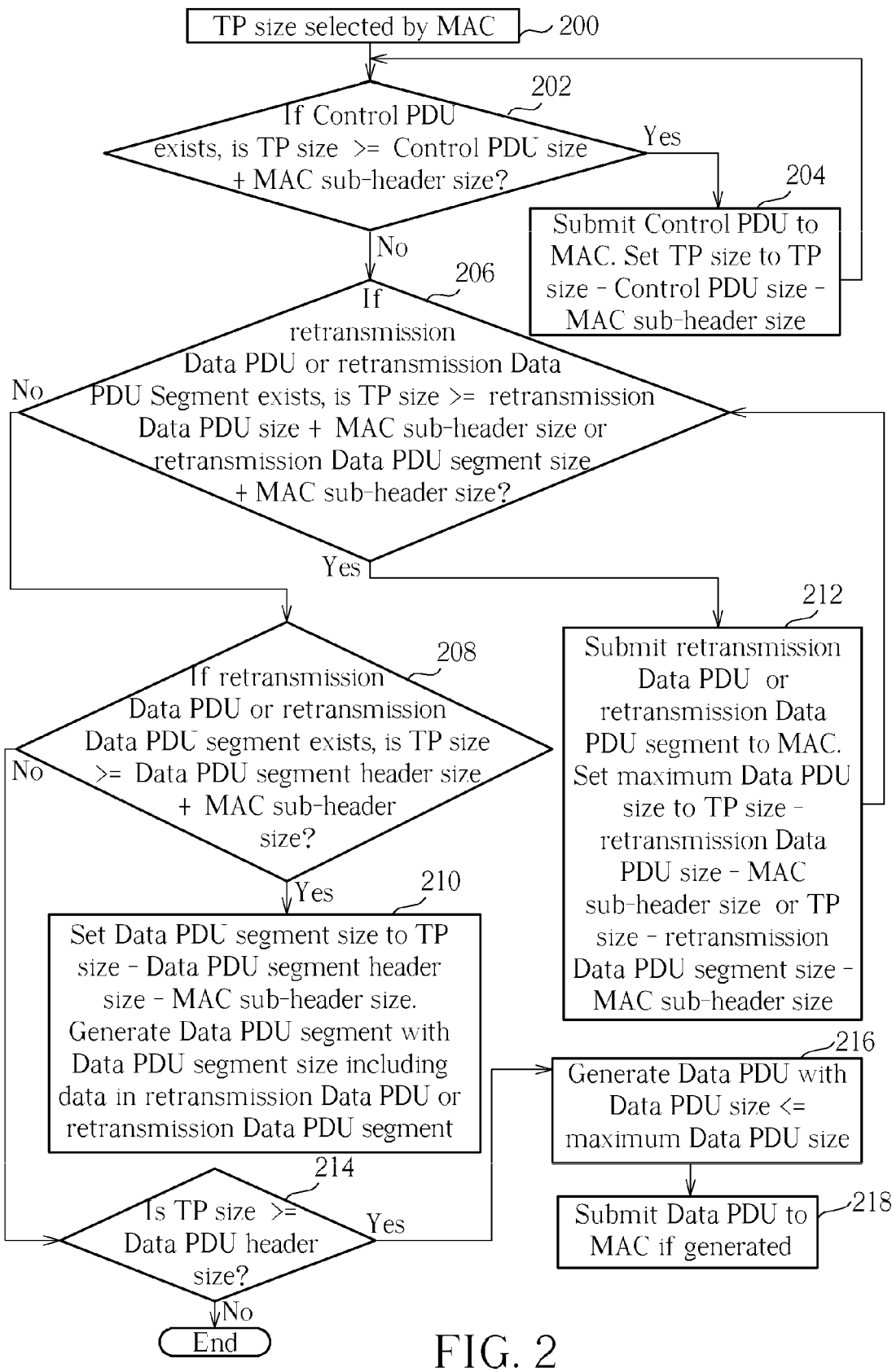
FIG. 2 is a flowchart of a method according to the first embodiment of the present invention.

This method is more clearly illustrated in the flowcharts shown, respectively, in FIG. 1 and FIG. 2. FIG. 1 is a flowchart of the above-mentioned method when the MAC sub-headers are not counted in RLC. FIG. 2 is a flowchart of the above-mentioned method when the MAC sub-headers are counted in RLC. The steps are illustrated as follows:

Step 100: TP size selected by MAC;

Step 102: If a Control PDU exists, is TP size>=Control PDU size? If yes go to Step 104, if no go to Step 106;

Step 104: Submit Control PDU to MAC. Set TP size to TP size−Control PDU size; Go to Step 102;

Step 106: If a retransmission Data PDU or a retransmission Data PDU Segment exists, is TP size>=retransmission Data PDU size or retransmission Data PDU segment size? If yes go to Step 112, if no go to Step 108;

Step 108: If a retransmission Data PDU or a retransmission Data PDU segment exists, is TP size>=Data PDU segment header size? If yes go to Step 110, if no go to Step 114;

Step 110: Set Data PDU segment size to TP size−Data PDU segment header size. Generate Data PDU segment with Data PDU segment size including data in retransmission Data PDU if retransmission Data PDU is selected for transmission; Generate a Data PDU segment with Data PDU segment size including data in a retransmission Data PDU segment if retransmission Data PDU segment is selected for transmission;

Step 112: Submit retransmission Data PDU to MAC if retransmission Data PDU is selected for transmission. Submit retransmission Data PDU segment to MAC if retransmission Data PDU segment is selected for transmission. Set maximum Data PDU size to TP size−retransmission Data PDU size if retransmission Data PDU is selected for transmission; Set maximum Data PDU size to TP size−retransmission Data PDU segment size if retransmission Data PDU segment is selected for transmission; Go to Step 106;

Step 114: Is TP size>=Data PDU header size? If yes go to step 116, if no end the process;

Step 116: Generate Data PDU with Data PDU size<=maximum Data PDU size; Go to Step 118;

Step 118: Submit Data PDU to MAC if generated.

Step 200: TP size selected by MAC;

Step 202: If a Control PDU exists, is TP size>=Control PDU size+MAC sub-header size? If yes go to Step 204, if no go to Step 206;

Step 204: Submit Control PDU to MAC. Set TP size to TP size−Control PDU size−MAC sub-header size; Go to Step 202;

Step 206: If a retransmission Data PDU or a retransmission Data PDU Segment exists, is TP size>=retransmission Data PDU size+MAC sub-header size or retransmission Data PDU segment size+MAC sub-header size? If yes go to Step 212, if no go to Step 208;

Step 208: If a retransmission Data PDU or a retransmission Data PDU segment exists, is TP size>=Data PDU segment header size+MAC sub-header size? If yes go to Step 210, if no go to Step 214;

Step 210: Set Data PDU segment size to TP size−Data PDU segment header size−MAC sub-header size. Generate Data PDU segment with Data PDU segment size including data in retransmission Data PDU if retransmission Data PDU is selected for transmission; Generate a Data PDU segment with Data PDU segment size including data in a retransmission Data PDU segment if retransmission Data PDU segment is selected for transmission;

Step 212: Submit retransmission Data PDU to MAC if retransmission Data PDU is selected for transmission. Submit retransmission Data PDU segment to MAC if retransmission Data PDU segment is selected for transmission. Set maximum Data PDU size to TP size−retransmission Data PDU size−MAC sub-header size if retransmission Data PDU is selected for transmission; Set maximum Data PDU size to TP size−retransmission Data PDU segment size−MAC sub-header size if retransmission Data PDU segment is selected for transmission; Go to Step 206;

Step 214: Is TP size>=Data PDU header size? If yes go to step 216, if no end the process;

Step 216: Generate Data PDU with Data PDU size<=maximum Data PDU size; Go to Step 218;

Step 218: Submit Data PDU to MAC if generated.

As mentioned above, sometimes RLC Control PDUs are sent in the same logical channel. TP and TB selection may therefore be inaccurate, as Control PDUs are not taken into account. The present invention provides a method to solve this problem.

In this embodiment, the MAC selects a fixed TB size, and dynamically adjusts the transmission payload size for each transmission opportunity. After the TB size is determined, the MAC selects to send all MAC Control elements first, along with the corresponding sub-headers. The total transmission payload size of RLC SDUs is then calculated as:

$$\text{MAC PDU size} - \text{size of MAC Control elements} - \text{size of MAC sub-headers of Control elements}$$

The MAC can then accurately determine a TP for a next transmission timing according to the selected TB size and the adjusted total transmission payload, wherein the next transmission timing will only involve transmission of data.

Figure 3:
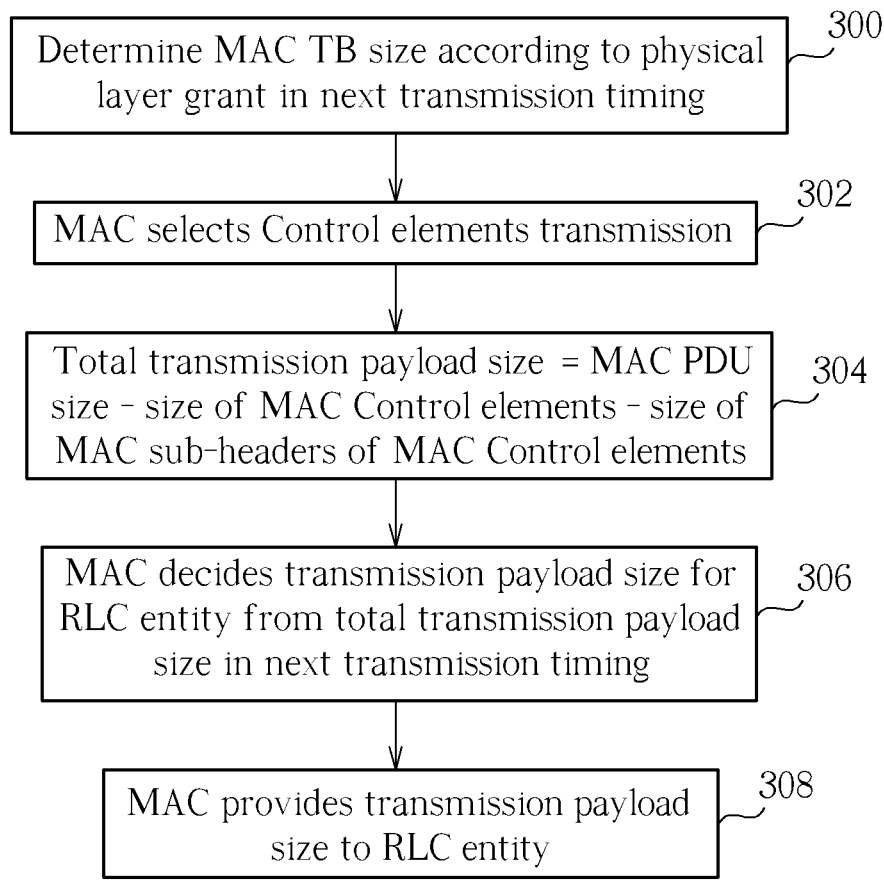
FIG. 3 is a flowchart of a method according to a second embodiment of the present invention.

This method is more clearly illustrated by the flowchart shown in FIG. 3. The steps are illustrated as follows:

Step 300: Determine MAC TB size according to physical layer grant in next transmission timing;

Step 302: MAC selects Control elements transmission;

Step 304: Total transmission payload size=MAC PDU size−size of MAC Control elements−size of MAC sub-headers of MAC Control elements;

Step 306: MAC decides transmission payload size for an RLC entity from total transmission payload size in a next transmission timing;

Step 308: MAC provides transmission payload size to the RLC entity.

According to the selected MAC Control elements and the adjusted total transmission payload, the MAC can therefore determine a TP size for an UM or AM RLC entity in a next transmission timing. As those skilled in the art will readily understand this modification, further detail is omitted.

The present invention therefore provides methods for accurately determining a size of a Data PDU to be transmitted by prioritizing Control PDUs/information transmission, and then adjusting a transmission payload size according to the transmitted Control PDUs/information. This prioritizing of Control information not only enables a size of Data PDUs to be determined more accurately, but also avoids situations where Data PDUs are unnecessarily segmented, and prevents delays in delivering RLC SDUs due to late transmission of Control information.

The method of the present embodiment (e.g. the process including the steps 100 to 118 shown in FIG. 1, the process including the steps 200 to 218 shown in FIG. 2 or the process including the steps 300 to 308 shown in FIG. 3) can also be embodied as a computer program product on a computer readable recording medium. The computer readable recording medium is any data storage device that can store data which can be thereafter read by a processor of a computer system. Examples of the computer readable recording medium include read-only memory (ROM), random-access memory (RAM), CD-ROMs, magnetic tapes, floppy disks, optical data storage devices, and carrier waves (such as data transmission through the Internet).

Those skilled in the art will readily observe that numerous modifications and alterations of the device and method may be made while retaining the teachings of the invention.

What is claimed is:

1. A method of determining a Data Packet Data Unit (PDU) size for a Radio Level Control (RLC) Unacknowledged Mode (UM) or Acknowledged Mode (AM) entity, the method comprising:

utilizing a Media Access Control (MAC) layer to set a transport block size according to a physical layer grant;

selecting MAC Control elements to be transmitted in a next transmission opportunity;

calculating a total transmission payload as the transport block size minus the sizes of the selected MAC Control elements minus the sizes of corresponding MAC sub-headers of the selected MAC Control elements;

setting a transmission payload size according to the total transmission payload; and determining the Data PDU size for the next transmission opportunity according to the set transmission payload size.

2. The method of claim 1, wherein when there is an RLC Control PDU to be transmitted, the method further comprises:

adjusting the set transmission payload size as the set transmission payload size minus the size of the RLC Control PDU.

3. The method of claim 1, wherein when there is an RLC Control PDU to be transmitted, the method further comprises:

adjusting the set transmission payload size as the set transmission payload size minus the size of the RLC Control PDU minus the size of a corresponding MAC sub-header of the RLC Control PDU.

4. A non-transitory computer program product arranged for causing a processor to execute the steps of:

utilizing a MAC layer to set a transport block size according to a physical layer grant;

selecting MAC Control elements to be transmitted in a next transmission opportunity;

calculating a total transmission payload as the transport block size minus the sizes of the selected MAC Control elements minus the sizes of corresponding MAC sub-headers of the selected MAC Control elements;

setting a transmission payload size according to the total transmission payload; and determining the Data PDU size for the next transmission opportunity according to the set transmission payload size.

5. The non-transitory computer program product of claim 4, wherein when there is an RLC Control PDU to be transmitted, the non-transitory computer program product is arranged for causing the processor to further execute the step of:

adjusting the set transmission payload size as the set transmission payload size minus the size of the RLC Control PDU.

6. The non-transitory computer program product of claim 4, wherein when there is an RLC Control PDU to be transmitted, the non-transitory computer program product is arranged for causing the processor to further execute the step of:

adjusting the set transmission payload size as the set transmission payload size minus the size of the RLC Control PDU minus the size of a corresponding MAC subheader of the RLC Control PDU.

* * * * *